(12) United States Patent
So et al.

(10) Patent No.: US 9,147,080 B2
(45) Date of Patent: Sep. 29, 2015

(54) SYSTEM AND METHODS FOR GRANULAR ACCESS CONTROL

(75) Inventors: Wai K. So, Daly City, CA (US); Kwai H. Man, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 12/026,576

(22) Filed: Feb. 6, 2008

(65) Prior Publication Data

US 2009/0199302 A1    Aug. 6, 2009

(51) Int. Cl.
G06F 21/00    (2013.01)
G06F 21/62    (2013.01)

(52) U.S. Cl.
CPC .... *G06F 21/6218* (2013.01); *G06F 2221/2141* (2013.01)

(58) Field of Classification Search
USPC ......................................................... 726/27
See application file for complete search history.

(56) References Cited

U.S. PATENT DOCUMENTS

| | | | |
|---|---|---|---|
| 7,200,593 B2 | 4/2007 | Shimomura et al. | |
| 2001/0021926 A1 | 9/2001 | Schneck et al. | |
| 2003/0135466 A1 | 7/2003 | Wang et al. | |
| 2005/0039034 A1* | 2/2005 | Doyle et al. | 713/193 |
| 2005/0262243 A1* | 11/2005 | Ternasky et al. | 709/225 |
| 2006/0074913 A1* | 4/2006 | O'Sullivan et al. | 707/9 |
| 2006/0080316 A1* | 4/2006 | Gilmore et al. | 707/9 |
| 2006/0287957 A1 | 12/2006 | Pieper et al. | |
| 2008/0066185 A1* | 3/2008 | Lester et al. | 726/27 |

FOREIGN PATENT DOCUMENTS

| | | |
|---|---|---|
| EP | 1669905 A2 | 6/2006 |
| JP | 2006252448 A | 9/2006 |
| JP | 2006268465 A | 10/2006 |

OTHER PUBLICATIONS

Han, Richard, Veronique Perret, and Mahmoud Naghshineh. "WebSplitter: a unified XML framework for multi-device collaborative Web browsing." Proceedings of the 2000 ACM conference on Computer supported cooperative work. ACM, 2000.*
Bertino, Elisa, Barbara Carminati, and Elena Ferrari. "A secure publishing service for digital libraries of XML documents." Information Security. Springer Berlin Heidelberg, 2001.*
A. Wool. Key Management for Encrypted Broadcast. ACM Transactions on Information and System Security, vol. 3, 107-134, May 2000.*
Ernesto Damiani et al., "A Fine-Grained Access Control System for XML Documents", ACM Transactions on Information and System Security, vol. 5, No. 2, May 2002, pp. 169-202.
Ji-Won Byun et al., "Purpose Based Access Control of Complex Data for Privacy Protection", SACMAT'05, Jun. 1-3, 2005, Stockholm, Sweden, ACM 1-59593-045-0/05/0006, 9 pages.

* cited by examiner

*Primary Examiner* — Vikkram Bali
*Assistant Examiner* — Tracy Mangialaschi
(74) *Attorney, Agent, or Firm* — Farrokh Pourmirzaie; Edell, Shapiro & Finnan, LLC

(57) ABSTRACT

A method and system for granular access control. An access control system allows a user or administrator to restrict access to electronic documents on a granular basis. Access may be restricted for individual data objects, types of objects, or even on a byte-by-byte basis. When a user attempts to access the electronic document, the access control system determines what parts, if any, of the document the user is permitted to access, and retrieves only those parts for access by the user. Data objects may include, for example, audio, video, graphics, or text.

20 Claims, 4 Drawing Sheets

| ACCESS CONTROL LIST ||||||||
| DOCUMENT OBJECT FIELDS ||| USER ACCESS RIGHTS ||||
| DOCUMENT ID | DATA OBJECT | DATA SUB-OBJECT | USER 1 | USER 2 | USER 3 | ... |
|---|---|---|---|---|---|---|
| DOCUMENT A | METADATA | N/A | FULL | READ | NONE | ... |
| DOCUMENT A | AUDIO DATA | TIME SEGMENT 1 (0:00:00 - 4:59:59) | FULL | READ | READ | ... |
| DOCUMENT A | AUDIO DATA | TIME SEGMENT 2 (5:00:00 - 9:59:59) | FULL | READ | NONE | ... |
| DOCUMENT A | VIDEO DATA | TIME SEGMENT 1 (0:00:00 - 4:59:59) | FULL | READ | READ | ... |
| DOCUMENT A | VIDEO DATA | TIME SEGMENT 2 (5:00:00 - 9:59:59) | FULL | READ | NONE | ... |
| DOCUMENT B | METADATA | N/A | NONE | FULL | READ | ... |
| DOCUMENT B | TEXTUAL DATA | PART 1 (PARAGRAPHS 1-15) | READ | FULL | NONE | ... |
| DOCUMENT B | TEXTUAL DATA | PART 2 (PARAGRAPHS 16-24) | READ | FULL | NONE | ... |
| DOCUMENT C | METADATA | N/A | NONE | READ | READ | ... |
| DOCUMENT C | GRAPHICS DATA | N/A | NONE | READ | READ | ... |
| ... | ... | ... | ... | ... | ... | |

80

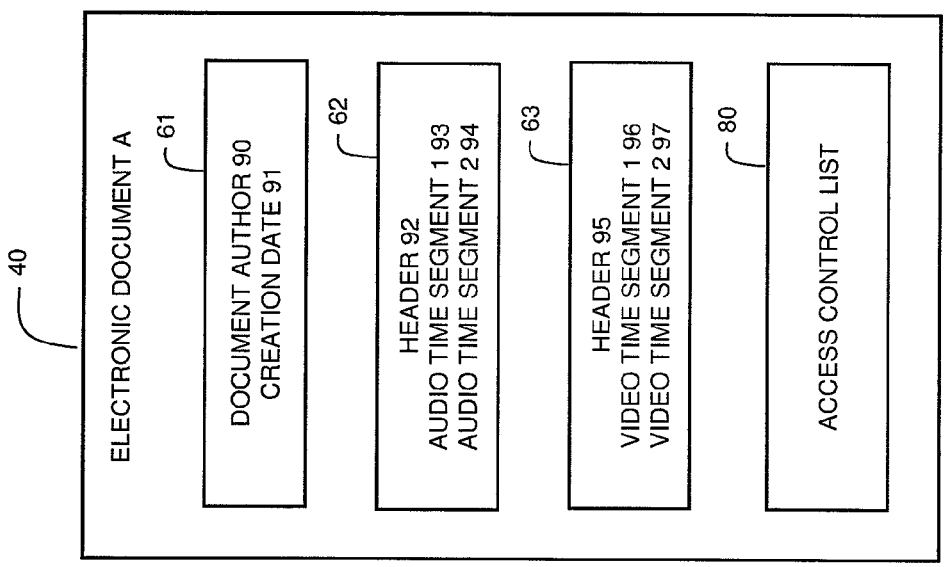

ACCESS CONTROL LIST 80

| DOCUMENT OBJECT FIELDS | | | USER ACCESS RIGHTS | | |
|---|---|---|---|---|---|
| DOCUMENT ID | DATA OBJECT | DATA SUB-OBJECT | USER 1 | USER 2 | USER 3 |
| DOCUMENT A | METADATA | N/A | FULL | READ | NONE |
| DOCUMENT A | AUDIO DATA | TIME SEGMENT 1 (0:00:00 - 4:59:59) | FULL | READ | READ |
| DOCUMENT A | AUDIO DATA | TIME SEGMENT 2 (5:00:00 - 9:59:59) | FULL | READ | NONE |
| DOCUMENT A | VIDEO DATA | TIME SEGMENT 1 (0:00:00 - 4:59:59) | FULL | READ | READ |
| DOCUMENT A | VIDEO DATA | TIME SEGMENT 2 (5:00:00 - 9:59:59) | FULL | FULL | NONE |
| DOCUMENT B | METADATA | N/A | NONE | FULL | READ |
| DOCUMENT B | TEXTUAL DATA | PART 1 (PARAGRAPHS 1-15) | READ | FULL | NONE |
| DOCUMENT B | TEXTUAL DATA | PART 2 (PARAGRAPHS 16-24) | READ | FULL | NONE |
| DOCUMENT C | METADATA | N/A | NONE | READ | READ |
| DOCUMENT C | GRAPHICS DATA | N/A | NONE | READ | READ |
| ... | ... | ... | ... | ... | ... |

FIG. 4

SYSTEM AND METHODS FOR GRANULAR ACCESS CONTROL

BACKGROUND OF THE INVENTION

1. Technical Field

The present invention relates generally to restricting access to electronic documents, and more particularly to restricting access to desired information subsets of electronic documents.

2. Discussion of Related Art

A content management system is a system that can typically manage all types of electronic documents including, for example, HTML and XML Web content, document images, office documents, e-mail messages, textual data, printed output, audio, video, and other digital representations of information. A conventional content management system provides security in the form of access control settings or permissions, whereby the extent of users' access to various resources is set forth. For example, in a company, certain users may have read only privileges for a particular electronic document, other users may have read/write privileges, while still other users may have no access privileges at all. These access control settings are usually tracked by means of an access control list, which is a data structure such as a table that specifies the rights of a user or group of users to access specific electronic documents.

Access control lists can restrict and provide a basic level of security, but may not provide the degree of access granularity desired to specific electronic documents of interest. For example, it may be desirable to limit access to certain sensitive documents or parts thereof, but not desirable to entirely disable or block access to the documents or hide their existence. Accordingly, individuals, organizations, associations and other types of entities interested in controlling access to electronic documents have a continuing interest in developing more flexible access control technologies that provide a greater degree of access granularity.

SUMMARY OF THE INVENTION

Accordingly, embodiments of the present invention include a method of managing access to electronic documents, comprising receiving a user request to access an electronic document stored in a storage area, where the electronic document comprises at least two data objects, determining an access control right associated with each data object in the requested document, processing the user request by receiving from the storage area only the data object or objects for which the associated access control rights permit access, and allowing the user access to the received data object or objects. The embodiments further include a program product apparatus and a system for managing access to electronic documents as described above.

Other embodiments of the present invention include a system for managing access to electronic documents, comprising an access control system operable to receive a data object from a stored electronic document and to determine an access control right for the data object, where the access control system is configured to receive a user request to access the stored electronic document, to determine the access control right of the data object, and to receive the data object in accordance with the access control right.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE DRAWINGS

FIG. 2 is a block diagram of an electronic document to which access is managed according to an embodiment of the present invention.

FIG. 3 is a diagrammatic illustration of an access control list that may be used in the system of FIG. 1 including access control rights organized in accordance with an embodiment of the present invention.

FIG. 4 is a diagrammatic illustration of an access control list that may be used in the system of FIG. 1 including access control rights organized in accordance with an embodiment of the present invention

DETAILED DESCRIPTION OF THE PREFERRED EMBODIMENTS

Embodiments of the present invention can be incorporated into document management systems that enable users at various authorization levels to access electronic documents in a flexible manner. Herein, "access" includes reading, viewing, writing, copying, deleting, printing, modification, etc. of a specific electronic document or its contents.

Figure 1:
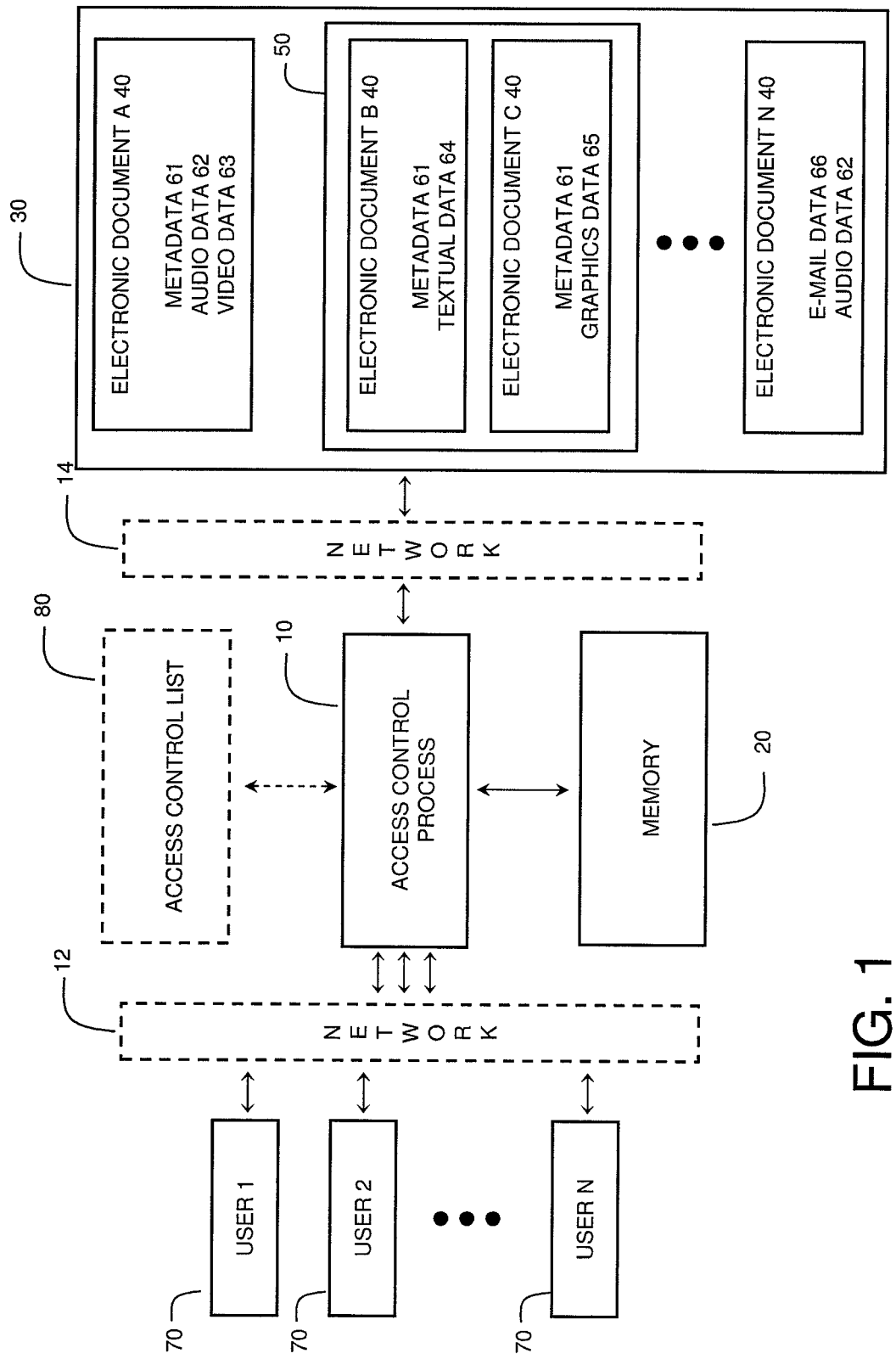
FIG. 1 is a block diagram of a system receiving access requests from end user systems and employing access control according to an embodiment of the present invention.

An exemplary system employing granular access according to an embodiment of the present invention is illustrated in FIG. 1. Specifically, the system includes an access control process 10 and associated shared or working memory 20, and one or more data storage areas 30 for storing electronic documents 40, 50 containing data objects 61, 62, 63, 64, 65, 66. The access control process 10 receives access queries from end-user systems 70 for electronic documents 40, 50 stored in the data storage areas 30, and determines the access control rights associated with each data object in the requested electronic document. The determination of access control rights may be made by, for example, consulting an access control list or lists 80 or consulting the metadata of the requested document or data object. If the requesting end-user is permitted to access one or more data objects in an electronic document, the access control process receives the accessible data objects from the data storage area, and load them in memory 20, from which the end-user system 70 is allowed access to the data object.

Access control process 10 may be implemented in the form of a processing system, or may be in the form of software. A processing system may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). If embodied in software, the access control process 10 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Memory 20 may be implemented by any conventional or other memory or storage device (e.g., RAM, cache, flash, etc.), and may include any suitable storage capacity. Data objects that an end-user is permitted to access are loaded from data storage areas 30 into memory 20, and the end-user is allowed access to the received data objects. Thus, performance can be enhanced by avoiding the processing, retrieval and/or loading into memory of extraneous data.

The data storage areas 30 may be local to the access control process 10, or remote from and in communication with the access control process 10 via a network 14. The data storage areas 30 may be implemented by any quantity of any type of conventional or other databases (e.g., relational, hierarchical, etc.) or storage structures (e.g., files, data structures, disk or other storage, etc.). The data storage areas may store any desired information arranged in any fashion (e.g., tables, relations, hierarchy, etc.).

The end-user systems 70 may be implemented by any quantity of conventional or other computer systems or devices (e.g., computer terminals, personal computers (e.g., IBM-compatible, Apple, tablet, laptop, etc.), cellular telephone, personal data assistant (e.g., Palm Pilot, Treo, etc.), etc.) and may include any commercially available operating system (e.g., Windows, OSX, Unix, Linux, etc.) and any commercially available or custom software (e.g., browser software, communications software, word processing software, etc.). These systems may include types of displays and input devices (e.g., keyboard, mouse, voice recognition, etc.) to enter and/or view information. The end-user systems 70 may be local to the access control process 10 and data storage areas 30, or remote from and in communication with the access control process 10 and data storage areas 30 via a network 12. An Application Program Interface (API) may be used to provide access to the access control processor 10. The end-user systems 70 may communicate with the access control processor 10 directly, or may submit the queries to a database server.

The networks 12, 14 may be implemented by any quantity by any quantity of any suitable communications media (e.g., WAN, LAN, Internet, Intranet, wired, wireless, etc.). The computer systems of the present invention embodiments (e.g., access control processor, data storage area, end-user systems, etc.) may include any conventional or other communications devices to communicate over the networks via any conventional or other protocols, and may utilize any type of connection (e.g., wired, wireless, etc.) for access to the network.

Electronic documents 40 can be any type of electronic file or data now known or later developed, such as, but not limited to HTML and XML Web content, document images, electronic records, database records, office documents, e-mail messages, textual data, printed output, electronic books, graphics, audio, video, other digital representations of information, and/or combinations thereof.

An electronic document 40 under the control of a document management system includes one or more data objects, each of which is associated with an access control right. These data objects can be general (e.g., common) to different types of electronic documents, or specific to a particular type of electronic document. For example, an electronic document that is a video file in a format such as AVI, MPEG4, or DV, such as electronic document "A" shown in FIG. 1, may contain general data objects such as metadata 61, and specific data objects such as audio data 62, video data 63, textual data 64, graphics data 65, e-mail data 66, and the like. Similarly, and with reference to FIG. 1, electronic document "B" 40 contains metadata 61 and textual data 64 data objects, electronic document "C" 40 contains metadata 61 and graphics data 65 data objects, and electronic document "n" 40 contains audio data 62 and e-mail data 66.

Electronic documents may also be combination documents, for example combination document 50 shown in FIG. 1, in which two or more documents are combined together, associated with, or embedded within each other. For example, combination document 50 illustrates a primarily textual document such as word processing document "B" 40 that is associated with, or has embedded within it, a graphics document "C" 40 such as a JPEG or GIF file. A combination document can be conceptualized as containing multiple sets of data objects, each set being associated with a particular document included in the combination document. For example, an email document with an embedded or associated video document contains a set of data objects for the email itself, as well as a set of data objects for the video document. Each set may be associated with a master access control right for the set, such that a user may be granted access control rights on a set-by-set basis, as well as on an object-by-object basis.

Each of the data objects may contain sub-objects, for example video data may contain sub-objects such as chapters, time segments (e.g., minute 1 to minute 2), frames, and the like, graphics data may contain sub-objects such as pages (of a multi-page file), images, filters, layers, colors, pixels, and the like, and metadata may be broken down into sub-objects such as document author, creation date, etc. Data objects may also be defined on a byte-by-byte basis, to enable highly granular access control to a document and its contents. Because access control can be mediated on a highly granular level, it is not necessary to store multiple copies of a document for users having various access control rights, e.g., redacted or "non-confidential" copies; instead, a single document copy may be stored, and access to its contents may be customized on a user-by-user basis. Thus, storage space in the data storage areas may be kept to a minimum.

As is evident to those skilled in the art, specific data objects and sub-objects may be standardized or customized, and the actual format and layout of data is dependent on its type, intended use, the manner in which it will be accessed, and the granularity of control desired for the object. Documents may also be formatted in accordance with predetermined templates, so that standardized objects can be used, or custom data objects and sub-objects can be created for individual documents or types of documents.

An exemplary electronic document "A" 40 is shown in FIG. 2, and comprises three data objects: metadata 61, audio data 62, and video data 63. The metadata data object 61 comprises two sub-objects: document author 90 and creation date 91. The audio data object 62 comprises three sub-objects: header 92, audio time segment 1 93, and audio time segment 2 94. The video data object 63 also comprises three sub-objects: header 95, video time segment 1 96, and video time segment 2 97. An access control list 80 is also associated with the document.

The access control rights assignable to a document, data object, or data sub-object may be any level or type of access desired, for example, no access, read, write, print, copy, modification, transmission, execute, and the like, or any combination of the foregoing. "Full" access may include all rights to the data (read, write, execute, etc.) Access control rights may be assigned to a user either individually or based on the user's membership in a particular user group, such as a system administrator group, end user group, document management group, etc.

Access control rights may be stored in an access control list or lists, or may form part of (or be referenced by) a data object's metadata. If a particular embodiment includes the optional access control list(s) 80, the list(s) may be implemented by any quantity of any type of conventional or other databases (e.g., relational, hierarchical, etc.) or storage structures (e.g., files, data structures, disk or other storage, etc.), and may store access control rights arranged in any fashion (e.g., tables, relations, hierarchy, etc.).

A non-limiting embodiment of an access control list 80 is shown in FIG. 3, which depicts an access control list 80 associated with an audio sub-object entitled "Audio Time Segment 1". As can be seen, the access control list associates certain access control rights (e.g., R=read, W=write, X=execute, -=none) with various users, for example the owner of the audio sub-object is given read and write access, the users in the group "Admin" are given read, write, and execute access, the users in the group "Managers" are given read and write access, the users in the group "Guest" are given no access, and other users are given read access only. In this embodiment, each sub-object in a data object has an access control list associated with it.

A different non-limiting embodiment of an access control list 80 is shown in FIG. 4, which depicts a database associating various user access rights (full, read, none, etc.) with various document object fields (data objects such as metadata, audio data, video data, etc., and sub-objects such as time segments, paragraphs, etc.). Such an access control list may be associated with multiple documents and multiple data objects, in contrast to the individual access control list depicted in the embodiment of FIG. 3. Access control rights may also be stored outside a list, for example in the metadata of a document, data object, or sub-object.

Figure 5:
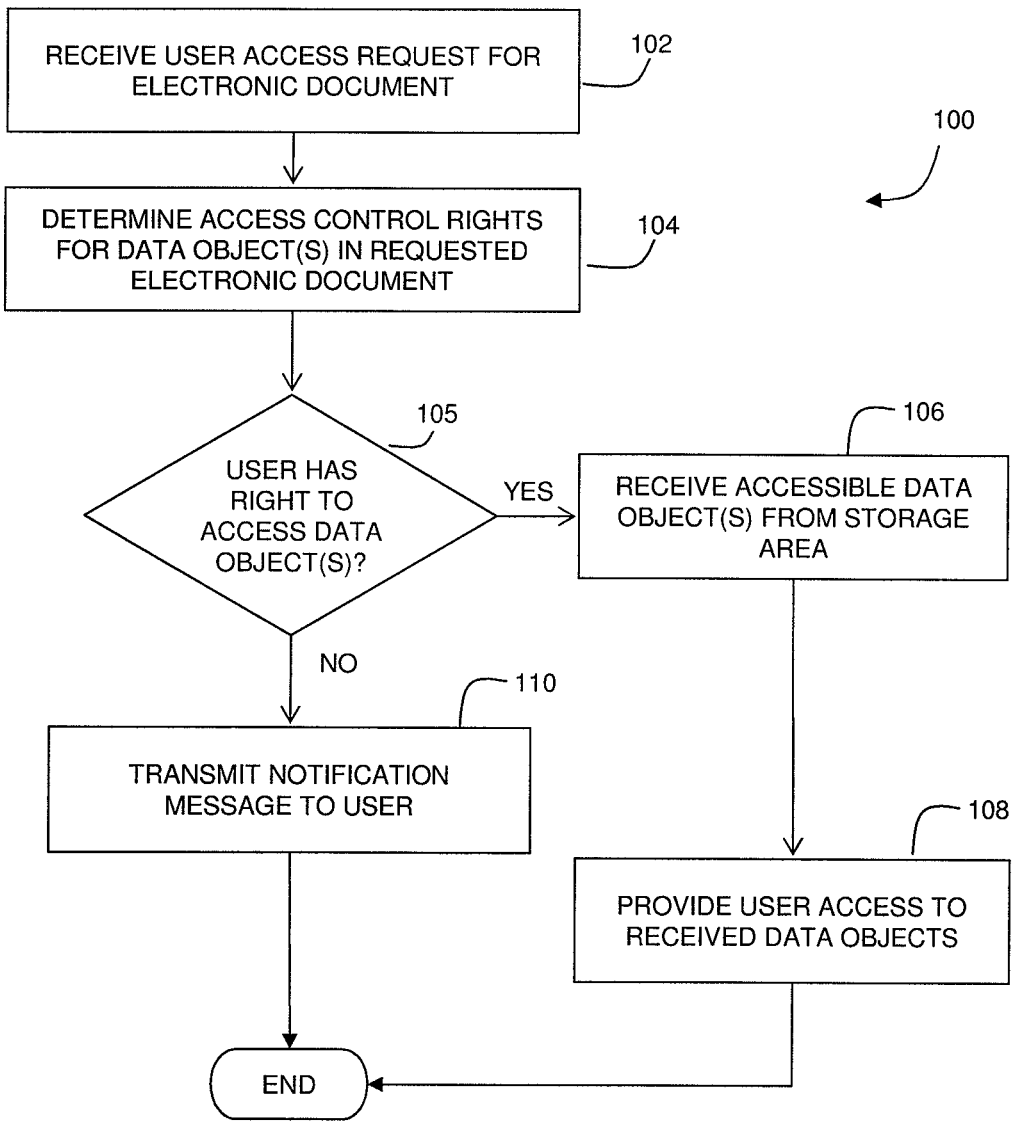
FIG. 5 is a procedural flow chart illustrating the manner in which an access request for a particular electronic document is managed to restrict or permit access according to an embodiment of the present invention.

Referring now to FIG. 5, a method flow diagram depicting an exemplary series of steps 100 for managing access to electronic documents according to an embodiment of the present invention is shown. As depicted, a user access request for a particular electronic document is received at step 102, and the access control rights for the data object(s) in the requested electronic document are determined at step 104. The access control rights may be stored in an access control list, or may be stored with the document to which they pertain, or may be stored in any other suitable fashion, as was previously described. If the user has a right to access a data object as determined in step 105, then that data object is received from the storage area and loaded into a memory or cache at step 106, from where the user is provided access to the data object(s) in step 108.

If the user does not have any rights to access any data objects in a requested document, a notification message is transmitted to the user at step 110. This message may be customized as appropriate for the system and the user's permitted access level. For example, the message may indicate that the requested document does not exist, or that the user does not have permission to access the requested document, or the like.

It is to be understood that the software (e.g., access control process, access control lists, data storage areas, API, etc.) for the computer systems of the present invention embodiments may be implemented in any desired computer language and could be developed by one of ordinary skill in the computer arts based on the functional descriptions contained in the specification and flow charts illustrated in the drawings. By way of example only, the access control process may be implemented in the "C", Perl, CGI, XML, Java, or PHP computing languages, the access control list and data storage areas may be implemented in MySQL, Oracle, SQL Server, IBM DB2, Informix or a flat database, and the API may be implemented in the "C" and/or Java computing languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention may be distributed in any manner among the access control processor, data storage areas, and end-user systems. By way of example, the data storage areas may include the appropriate modules to perform the access control management described above. The software and/or algorithms described above and illustrated in the flow charts may be modified in any manner that accomplishes the functions described herein. In addition, the functions in the flow charts or description may be performed in any order that accomplishes a desired operation.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

An access control processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the access control processing system to become coupled to other access control processing systems or remote printers or storage devices through intervening private or public networks. Modems, cable modem and Ethernet cards are just a few of the currently available types of network adapters.

It will be appreciated that the embodiments described above and illustrated in the drawings represent only a few of the many ways of implementing an access control system. Having described preferred embodiments of a new and improved access control system and method for accessing stored electronic documents, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of managing access to electronic documents, comprising:
   receiving, at an access control system, a request from an end-user system for access to an electronic document, wherein the electronic document comprises metadata and a plurality of data objects with at least one data object comprising a media object that is divided into a plurality of media sub-objects based on segments of content corresponding to different specific time intervals within the media object content, wherein the metadata includes access control rights indicating a level of access for each media sub-object, and wherein the level of access for each media sub-object indicates permitted read and write type operations on that media sub-object;
   identifying, by the access control system, one or more media sub-objects for which the end-user system has access authorization based on the access control rights; and
   allowing the end-user system access to the identified one or more media sub-objects to control access on a sub-object basis.

2. The method according to claim 1, wherein the plurality of data objects includes at least one second data object comprising a second media object that is divided into a plurality of media sub-objects based on specified bytes of the second media object content, wherein the second media object comprises audiovisual content and one or more media sub-objects of the second media object comprise a portion of the audiovisual content, wherein the specified bytes represent one of individual chapters and individual frames.

3. The method according to claim 1, wherein said identifying step comprises identifying access authorization by consulting an access control list.

4. The method according to claim 1, further comprising a step of:
   if no data objects have been identified for which the end-user system has access authorization, transmitting a notification message to the requesting end-user system.

5. The method according to claim 1, wherein the at least one data object and plurality of media sub-objects comprise content information and the metadata storing access control rights, and wherein said identifying step comprises identifying whether the access control rights stored in the metadata permit access by the requesting end-user system.

6. The method according to claim 1, wherein said plurality of data objects further includes content independently selected from the group consisting of audio data, video data, textual data, and graphics data.

7. The method according to claim 1, wherein the access authorization comprises an access control right selected from the group consisting of no access, read access, write access, print access, copy access, modification access, transmission access, execution access, or any combination thereof.

8. The method according to claim 1, wherein the plurality of data objects includes at least one second data object comprising a second media object that is divided into a plurality of media sub-objects based on specified bytes of the second media object content, wherein the second media object comprises textual content and one or more media sub-objects of the second media object comprise a portion of the textual content.

9. The method according to claim 1, wherein the plurality of data objects includes at least one second data object comprising a second media object that is divided into a plurality of media sub-objects based on specified bytes of the second media object content, wherein the second media object comprises graphical content, one or more media sub-objects of the second media object comprise a portion of the graphical content, and the specified bytes represent one of individual pages of a multi-page object, individual images of a plurality of images, individual filters, individual layers, individual colors, and individual pixels.

10. A computer program product comprising a computer useable memory device having a computer readable program stored thereon, wherein the computer readable program when executed on a computer causes the computer to:
    receive a request from an end-user system for access to an electronic document, wherein the electronic document comprises metadata and a plurality of data objects with at least one data object comprising a media object that is divided into a plurality of media sub-objects based on segments of content corresponding to different specific time intervals within the media object content, wherein the metadata includes access control rights indicating a level of access for each media sub-object, and wherein the level of access for each media sub-object indicates permitted read and write type operations on that media sub-object;
    identify one or more media sub-objects for which the end-user system has access authorization based on the access control rights; and
    allow the end-user system access to the identified one or more media sub-objects to control access on a sub-object basis.

11. The computer program product according to claim 10, wherein said identification comprises identifying access authorization by consulting an access control list.

12. The computer program product according to claim 10, further comprising:
    if no data objects have been identified for which the end-user system has access authorization, transmitting a notification message to the requesting end-user system.

13. The computer program product according to claim 10, wherein the at least one data object and plurality of media sub-objects comprise content information and the metadata storing access control rights, and wherein said identification step comprises identifying whether the access control rights stored in the metadata permit access by the requesting end-user system.

14. The computer program product according to claim 10, wherein the plurality of data objects includes at least one second data object comprising a second media object that is divided into a plurality of media sub-objects based on specified bytes of the second media object content, wherein the second media object comprises textual content and one or more media sub-objects of the second media object comprise a portion of the textual content.

15. The computer program product according to claim 10, wherein the plurality of data objects includes at least one second data object comprising a second media object that is divided into a plurality of media sub-objects based on specified bytes of the second media object content, wherein the specified bytes represent for audiovisual content one of individual chapters and individual frames, and wherein the specified bytes represent for graphical content one of individual pages of a multi-page object, individual images of a plurality of images, individual filters, individual layers, individual colors, and individual pixels.

16. A system for managing access to electronic documents, comprising:
a memory having one or more electronic documents stored therein;
an access control system configured with logic to:
receive a request from an end-user system for access to an electronic document, wherein the electronic document comprises metadata and a plurality of data objects with at least one data object comprising a media object that is divided into a plurality of media sub-objects based on segments of content corresponding to different specific time intervals within the media object content, wherein the metadata includes access control rights indicating a level of access for each media sub-object, and wherein the level of access for each media sub-object indicates permitted read and write type operations on that media sub-object;
identify one or more media sub-objects for which the end-user system has access authorization based on the access control rights; and
allow the end-user system access to the identified one or more media sub-objects to control access on a sub-object basis.

17. The system of claim 16, wherein the plurality of data objects includes at least one second data object comprising a second media object that is divided into a plurality of media sub-objects based on specified bytes of the second media object content, wherein the second media object comprises textual content and one or more media sub-objects of the second media object comprise a portion of the textual content.

18. The system of claim 16, wherein the access authorization is stored as part of the at least one data object.

19. The system of claim 16, wherein the access authorization is stored in an access control list.

20. The system of claim 16, wherein the plurality of data objects includes at least one second data object comprising a second media object that is divided into a plurality of second media sub-objects based on specified bytes of the second media object content, wherein the specified bytes represent for audiovisual content one of individual chapters and individual frames, and wherein the specified bytes represent for graphical content one of individual pages of a multi-page object, individual images of a plurality of images, individual filters, individual layers, individual colors, and individual pixels.

\* \* \* \* \*